United States Patent [19]

Lockwood et al.

[11] 4,101,465

[45] Jul. 18, 1978

[54] A COCATALYST SYSTEM FOR TRIMERIZING ISOCYANATES

[75] Inventors: Robert J. Lockwood, East Haven; Alexander McLaughlin, Meriden; Harold E. Reymore, Jr., Wallingford, all of Conn.

[73] Assignee: The Upjohn Company, Kalamazoo, Mich.

[21] Appl. No.: 729,899

[22] Filed: Oct. 6, 1976

[51] Int. Cl.$^2$ ............................................. C08G 18/14
[52] U.S. Cl. ................................ 521/118; 252/431 C; 252/431 N; 428/425; 521/125; 521/902; 521/156; 521/162
[58] Field of Search .................. 260/2.5 AW, 2.5 AC, 260/77.5 NC, 77.5 AC, 75 NC; 252/431 C, 431 N; 428/425

[56] References Cited

U.S. PATENT DOCUMENTS

| | | | |
|---|---|---|---|
| 3,010,963 | 11/1961 | Erner | 260/2.5 AC |
| 3,892,687 | 7/1975 | Bechara et al. | 260/2.5 AW |
| 3,896,052 | 7/1975 | Lockwood et al. | 260/2.5 AW |
| 4,040,992 | 8/1977 | Bechara et al. | 260/2.5 AC |

*Primary Examiner*—M. J. Welsh
*Attorney, Agent, or Firm*—James S. Rose; Denis A. Firth

[57] ABSTRACT

A novel cocatalyst combination for the trimerization of polyisocyanates to polyisocyanurates is disclosed. The catalyst combination comprises: (a) alkali metal glycine salts, (b) hydroxyalkyltrialkylammonium carboxylate salts, and (c) alkali metal salts selected from the group consisting of (i) alkali metal salts of N-phenyl aliphatic amides, and (ii) alkali metal salts of aliphatic carboxylic acids. The use of the cocatalyst combination provides for the facile formation of polyisocyanurate foam laminate boardstock which is characterized by good fire resistance and good physical properties.

26 Claims, No Drawings

A COCATALYST SYSTEM FOR TRIMERIZING ISOCYANATES

BACKGROUND OF THE INVENTION

1. Field of the Invention

This invention relates to the preparation of polymer foams and is more particularly concerned with novel catalyst combinations for the trimerization of polyisocyanates to polyisocyanurates and their utilization in the preparation of polyisocyanurate foams.

2. Description of the Prior Art

Rigid polyisocyanurate foams having high resistance to flame and heat as well as excellent thermal insulating capacity are known in the art. The prior art discloses methods for preparing such foams by reacting an organic polyisocyanate with a trimerizing catalyst in the presence of a blowing agent, and a minor proportion (usually less than 0.5 equivalent per equivalent of polyisocyanate) of a polyol; see for example U.S. Pat. Nos. 3,516,950, 3,580,868, 3,620,986, 3,625,872, and 3,725,319. The process described in U.S. Pat. No. 3,745,133 discloses the use of a combination of an epoxide and a tertiary amine as cocatalysts.

Certain quaternary hydroxyalkyl tertiary amine bases have been recognized as possessing catalytic activity for polyurethane or polyisocyanurate formation; see U.S. Pat. Nos. 3,010,963, 3,892,687, B 497,194 (published Feb. 3, 1976), and B 490,946 (published Feb. 17, 1976).

The prior art has also recognized the inherent problems in the combination of a polyurethane forming reaction with a polyisocyanurate forming one, particularly with regard to the difference in the two reaction rates and methods of overall rate control. U.S. Pat. Nos. 3,896,052 and 3,903,018, whose disclosures are hereby incorporated by reference, provide catalyst combinations which overcome these difficulties.

A particularly difficult catalysis problem is encountered in the preparation of polyisocyanurate foam laminate board stock. It requires a foam rise profile characterized by a long extended cream time followed by a rapid rise and cure out. U.S. Pat. No. 3,896,052 provides catalyst combinations which meet these requirements. However, the optimum catalyst mixtures disclosed therein call for the combination of amide and glycine salts in conjunction with a tertiary amine trimerization catalyst and a monomeric epoxide component. The reactivity between the other foam ingredients, particularly amines and epoxides, precludes their being preblended prior to the actual polymerization stage. Accordingly, the number of reactant streams going to the reaction zone must be at least three in order to accommodate separate polyisocyanate, polyol plus amine, and epoxide ingredients. The majority of foam laminate machinery presently available is equipped for only two component lines to the mixing zone.

The present invention provides a catalyst combination which can be used in a two component system, i.e. a system in which the reaction components can be preblended to form just two reactant streams. Surprisingly, it has been discovered that the epoxide and tertiary amine components of the prior art catalyst combinations can be replaced by a single component, namely one or more hydroxyalkyltrialkylammonium carboxylate salts. Moreover, the substitution of this minor amount of ammonium carboxylate for the substantial amount of epoxide and amine effects an economic advantage, and gives rise to excellent foam exotherms and rise characteristics which result in extended foam cream times which are immediately followed by rapid rise and cure out periods.

SUMMARY OF THE INVENTION

This invention comprises a cocatalyst combination for the trimerization of an organic polyisocyanate which combination comprises:

(a) from about 11 to about 85 mole percent of a glycine salt having the formula

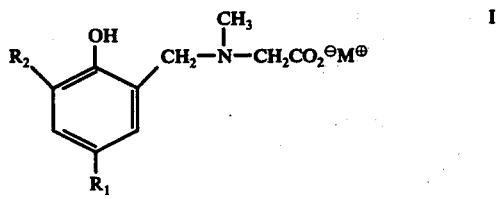

wherein M is an alkali metal, $R_1$ is selected from the class consisting of hydrogen and alkyl having from 1 to 12 carbon atoms, and $R_2$ is selected from the class consisting of hydrogen and the group

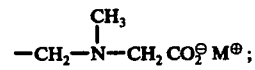

(b) from about 4 to about 63 mole percent of a hydroxyalkyltrialkylammonium carboxylate salt having the formula

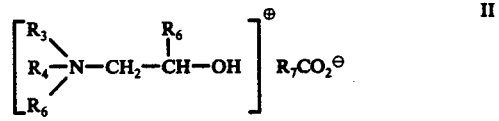

wherein $R_3$, $R_4$ and $R_5$ can be the same or different and represent alkyl having from 1 to 4 carbon atoms, inclusive, $R_6$ is selected from the group consisting of H and alkyl having from 1 to 4 carbon atoms, inclusive, and $R_7$ is selected from the class consisting of hydrogen and alkyl having from 1 to 8 carbon atoms inclusive; and (c) from about 6 to about 77 mole percent of an alkali metal salt selected from the group consisting of (i) an amide salt having the formula

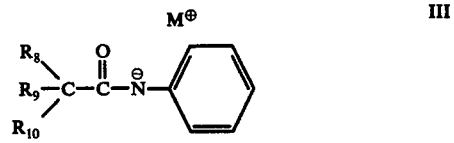

wherein M is as defined hereinbefore, $R_8$, $R_9$, and $R_{10}$ can be the same or different and are selected from the group consisting of H and alkyl from 1 to 4 carbon atoms, inclusive; and (ii) a carboxylic acid salt having the formula

wherein $R_8$, $R_9$, $R_{10}$, and M are as defined hereinbefore.

The term "alkali metal" means sodium, potassium, and lithium.

Alkyl from 1 to 4 carbon atoms includes methyl, ethyl, propyl, butyl, and isomeric forms thereof. Alkyl from 1 to 8 carbon atoms includes the alkyl groups above as well as pentyl, hexyl, heptyl, octyl, and isomeric forms thereof. Alkyl from 1 to 12 carbon atoms includes the alkyl groups set forth for alkyl from 1 to 8 carbon atoms above as well as nonyl, decyl, undecyl, dodecyl, and isomeric forms thereof.

The invention also comprises an improved process for the preparation of a cellular polymer in which the major recurring polymer unit is isocyanurate, particularly in the form of a laminate which process comprises bringing together, in the presence of a blowing agent, an organic polyisocyanate, a minor amount of a polyol, and a cocatalyst system as recited hereinabove.

The invention also comprises the cellular polymers produced in accordance with the above process.

DETAILED DESCRIPTION OF THE INVENTION

The cocatalyst combination of the present invention comprises a mixture of (a) a glycine salt having the formula (I) above, (b) a hydroxyalkyltrialkylammonium carboxylate salt having the formula (II) above, and (c) an alkali metal salt selected from the group consisting of (i) an amide salt and (ii) a carboxylic acid salt having the respective formulae (III) and (IV) above. The use of mixtures of salts falling within each category of (a), (b), and (c) are included in the scope of the present invention. In a preferred embodiment the cocatalyst combination comprises the components (a), (b), and (c) wherein the alkali metal (c) is the amide salt (formula III). The components can be brought together during the polymerization of the organic polyisocyanate to polyisocyanurate or they can be premixed prior to the polymerization reaction and stored for an indefinite period as a single catalyst entity without detracting from their activity.

The glycine salt (a) is defined in formula (I) hereinabove and is fully disclosed, including its method of preparation, in U.S. Pat. No. 3,896,052, whose disclosure is incorporated herein by reference. A particularly preferred group of glycine salts (a) are those having the formula

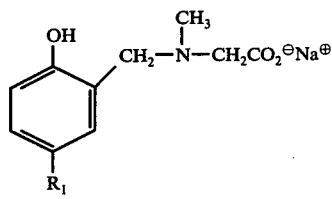

wherein $R_1$ is defined as above.

Component (a) is advantageously employed in the cocatalyst combination in a proportion of from about 11 mole percent to about 85 mole percent of said combination of (a), (b), and (c), preferably from about 24 mole percent to about 68 mole percent, and most preferably from about 35 mole percent to about 65 mole percent. It is to be understood that proportions can be varied within the specified ranges so long as the appropriate adjustment is made in the remaining components (b) and (c) to maintain a total mole percent for (a) plus (b) plus (c) of 100.

Illustrative of the glycine salt compounds to be used in the present invention are,
sodium N-(2-hydroxy-5-methylphenyl)methyl-N-methyl glycinate,
sodium N-(2-hydroxy-5-ethylphenyl)methyl-N-methyl glycinate,
sodium N-(2-hydroxy-5-butylphenyl)methyl-N-methyl glycinate,
sodium N-(2-hydroxy-5-heptylphenyl)methyl-N-methyl glycinate,
sodium N-(2-hydroxy-5-nonylphenyl)methyl-N-methyl glycinate,
sodium N-(2-hydroxy-5-dodecylphenyl)methyl-N-methyl glycinate,
potassium N-(2-hydroxy-5-nonylphenyl)methyl-N-methyl glycinate,
lithium N-(2-hydroxy-5-nonylphenyl)methyl-N-methyl glycinate,
disodium salt of 2,6-bis(N-carboxymethyl-N-methylaminomethyl)-p-ethylphenol,
disodium salt of 2,6-bis(N-carboxymethyl-N-methylaminomethyl)-p-nonylphenol, and mixtures thereof.

A preferred component (a) is sodium N-(2-hydroxy-5-nonylphenyl)methyl-N-methyl glycinate.

In a preferred embodiment of the invention, the glycine salt (a) is employed in the cocatalyst in combination with a diluent. The diluent can be the reaction solvent, or mixtures thereof, employed in the preparation of component (a) as set forth in U.S. Pat. No. 3,896,052. A particularly preferred class of diluents consists of ethylene glycol, diethylene glycol, polyethylene glycol 400, and mixtures thereof. The concentration of the glycine salt dissolved in the diluent is not critical and can vary from about 25 percent to about 75 percent by weight. A particularly preferred species of solvent or diluent is diethylene glycol.

The hydroxyalkyltrialkylammonium carboxylate salt (b) is defined in formula (II) hereinabove and can be prepared by the method disclosed in U.S. Pat. No. 3,010,963. Alternatively, it can be prepared by simply bringing together the appropriate tertiary amine (V), alkylene oxide (VI), and carboxylic acid (VII) in any solvent which is inert to the reactants and the product (II) under the conditions of preparation in accordance with the following equation

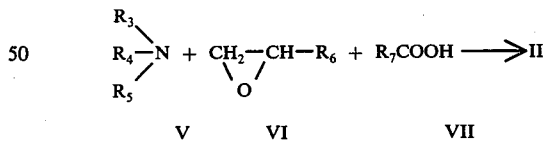

wherein $R_3$, $R_4$, $R_5$, $R_6$, and $R_7$ have the meaning set forth hereinabove. The reactants can be employed in equimolar proportions but advantageously the amine (V) is employed in an excess of from about 10 mole percent to about 100 mole percent. Reactants are stirred for a period of from about 1 hour to about 24 hours at a temperature of from about 5° C to about 50° C. Any solvent can be employed provided it does not react preferentially with the compounds V, VI, or VII under the conditions set forth above. A particularly preferred group of solvents consists of ethylene glycol, propylene glycol, butylene glycol, diethylene glycol, dipropylene glycol, dibutylene glycol, and the like. A most preferred solvent is dipropylene glycol.

Generally speaking, the solvent in which the salt (II) is prepared is not removed after the reaction is complete and the solution is employed directly in the catalyst combination. Further, if excess amine (V) has been employed in the preparation of (II), optionally, it can be left in the solution. In a preferred embodiment the excess amine is removed preferably by heating the reaction solution in vacuo.

Optionally, co-solvents can be employed in conjunction with the solvents discussed above, either during the preparation of (II) or, preferably, to aid in the solubilization of (II). Typical co-solvents include the alkanols such as methanol, ethanol, butanol, isopropanol, and the like; the dipolar aprotic solvents such as dimethylformamide, dimethylacetamide, dimethylsulfoxide, and the like; the chlorinated solvents such as chloroform, monofluorotrichloromethane, and the like. A preferred co-solvent is chloroform.

A particularly preferred group of hydroxyalkyltrialkylammonium carboxylate salts (b) are those having the formula

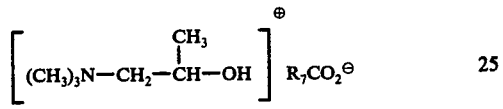

wherein $R_7$ is defined as above.

Component (b) is advantageously employed in the cocatalyst combination in a proportion of from about 4 mole percent to about 63 mole percent of said combination of (a), (b), and (c), preferably from about 8 mole percent to about 46 mole percent, and most preferably from about 10 mole percent to about 36 mole percent. Similarly to component (a), the proportions can be varied within the specified ranges to the extent that the total mole percent of (a) plus (b) plus (c) equals 100 as set forth above.

Illustrative examples of component (b) are,
2-hydroxyethyltrimethylammonium formate,
2-hydroxyethyltriethylammonium formate,
2-hydroxyethyltributylammonium formate,
2-hydroxyethyldiethylmethylammonium formate,
2-hydroxyethyldipropylmethylammonium formate,
2-hydroxypropyltrimethylammonium formate,
2-hydroxypropyltrimethylammonium acetate,
2-hydroxypropyltrimethylammonium propionate,
2-hydroxypropyltrimethylammonium butyrate,
2-hydroxypropyltrimethylammonium hexanoate,
2-hydroxypropyltrimethylammonium 2-ethylhexanoate,
2-hydroxybutyltrimethylammonium formate,
2-hydroxyhexyltrimethylammonium acetate,
and mixtures thereof.

A most preferred group consists of 2-hydroxypropyltrimethylammonium formate, and 2-hydroxypropyltrimethylammonium 2-ethylhexanoate.

In a preferred embodiment of the invention, the ammonium carboxylate salt (b) is employed in the cocatalyst combination as a solution in a solvent, or mixture of co-solvents as set forth hereinbefore. The concentration of salt (b) dissolved in the diluent is not critical and can vary from about 25 percent to about 75 percent by weight. When co-solvents are employed the ratio in parts by weight of one solvent to another can vary from about 4:1 to 1:4 and preferably from about 2:1 to about 1:2. A preferred co-solvent mixture is comprised of chloroform and dipropylene glycol in the ratio of about 2:1 parts by weight respectively. And a preferred concentration of salt (b) dissolved in this mixture is from about 30 percent by weight to about 60 percent by weight.

The third component (c) is an alkali metal salt selected from the group consisting of (i) an amide salt defined in formula (III) hereinabove and (ii) a carboxylic acid salt defined in formula (IV) hereinabove. Component (c) is advantageously employed in the cocatalyst combination in a proportion of from about 6 mole percent to about 77 mole percent of said combination, preferably from about 15 mole percent to about 57 mole percent, and most preferably from about 18 mole percent to about 43 mole percent. Similarly to components (a) and (b) the proportions can be varied within the specified ranges to the extent that the total mole percent of (a) plus (b) plus (c) equals 100 as set forth above.

The amide salt (i) is defined in formula (III) hereinabove and is fully disclosed, including its method of preparation, in U.S. Pat. No. 3,896,052, whose disclosure is incorporated herein by reference. A particularly preferred group of amide salts are those having the formula

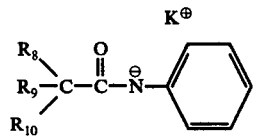

wherein $R_8$, $R_9$, $R_{10}$ are defined as above.

Illustrative examples of the amide salt compounds are,
sodium N-phenylacetamide,
potassium N-phenylacetamide,
lithium N-phenylacetamide,
potassium N-phenylpropionamide,
potassium N-phenylbutyramide,
potassium N-phenylvaleramide,
potassium N-phenylhexamide,
potassium N-phenyl-2-methylpropionamide,
potassium N-phenyl-2-methylhexamide,
potassium N-phenyl-2-ethylhexamide, and mixtures thereof.

A particularly preferred amide salt is potassium N-phenyl-2-ethylhexamide.

In a preferred embodiment of the invention, the amide salt (i) is employed in the cocatalyst combination as a solution in a solvent, or mixture of co-solvents. Solvents and co-solvents which can be used to solubilize the amide salt (i) are the same solvents and co-solvents set forth hereinabove for use with the ammonium carboxylate salts (b). The concentration of salt (i) dissolved in the diluent is not critical and can vary from about 25 percent to about 75 percent by weight. When co-solvents are employed, similarly to the ammonium carboxylate salts (b) set forth hereinbefore, the ratio in parts by weight of one solvent to another can vary from about 4:1 to about 1:4 and preferably from about 2:1 to about 1:2. A preferred co-solvent mixture for use in solubilizing the amide salt (i) is comprised of ethylene glycol and dimethylformamide in the ratio of about 1:1 parts by weight. And a preferred concentration of salt (i) dissolved in this mixture is from about 30 percent by weight to about 60 percent by weight.

The carboxylic acid salt (ii) is defined in formula (IV) hereinabove and it will be readily apparent to those skilled in the art that simple, and readily available, alkali metal salts of aliphatic carboxylic acids fall into this class. A particularly preferred group of carboxylic acid salts are those having the formula

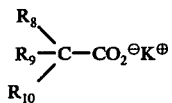

wherein $R_8$, $R_9$, and $R_{10}$ are defined as above.

Illustrative examples of the carboxylic acid salts are, sodium acetate,
potassium acetate,
lithium acetate,
sodium propionate,
potassium propionate,
lithium propionate,
potassium butyrate,
potassium valerate,
potassium hexanoate,
potassium 2-methylpropionate,
potassium 2-methylhexanoate,
potassium 2-ethylhexanoate, and mixtures thereof.

A particularly preferred group of salts consists of potassium acetate and potassium 2-ethylhexanoate.

In a preferred embodiment of the invention, the carboxylic salt (ii) is employed in the cocatalyst combination as a solution in a solvent, or mixture of co-solvents. Any solvent can be employed provided it does not react with the component (ii). A preferred group of solvents consists of ethylene glycol, propylene glycol, butylene glycol, diethylene glycol, dipropylene glycol, dibutylene glycol, and the like. A particularly preferred group consists of ethylene glycol and dipropylene glycol. The concentration of the salt dissolved in the solvent or diluent is not critical and can vary from about 25 percent to about 75 percent by weight, preferably from about 25 percent to about 60 percent by weight.

In a preferred embodiment of the present invention an organic polyisocyanate is converted to a cellular polymer in the presence of a blowing agent. The foams or cellular polymers are prepared using techniques well known to those skilled in the art; see any of the references cited supra for extensive teaching with respect to the preparation of cellular polymers. The cellular polymers produced in accordance with the present invention when analyzed by infrared spectroscopic methods, display the strong absorption at $7.05 - 7.10\mu$ which is the characteristic identification for the isocyanurate ring.

In a most preferred embodiment of the present invention the cellular polyisocyanurates are employed in the preparation of foam laminates set forth in greater detail hereinbelow. It is in the preparation of said laminates wherein the most attractive and unexpected advantages of the present invention reside. The instability of an epoxy component in combination with other foam ingredients has always necessitated the use of three separate component streams in the machine preparation of polyisocyanurate foams. This has hindered the acceptance and production of polyisocyanurate foams in laminate technology due to the fact that most foam laminate machines are equipped for only two component mixing. Surprisingly, the cocatalyst combination of the present invention provides for a two component stream system whereby one component or stream includes the organic isocyanate component while the second component or stream includes the minor amount of polyol and the catalyst combination. Blowing agents and optional ingredients can be present in either, or, both streams. It is to be understood that the catalyst combination of the present invention is not limited to a two stream technique. Any number of streams available, or, desirable, can be employed.

In a further advantage to flow from the use of the cocatalyst combination of the present invention, the excellent rise profiles and cure out, including good long cream times which allow manipulation of the laminate facers and foam mix, followed by rapid cure, provide for efficient laminate production.

The polyols employed in preparing polyisocyanurate foams in accordance with the present invention include any of the polyols set forth in U.S. Pat. No. 3,745,133, and U.S. Pat. No. 3,423,344 whose disclosures are both incorporated herein by reference, or any of those known in the art to be useful as a minor component in the preparation of polyisocyanurate foams; see supra. Said polyols can be added separately during the trimerization of the polyisocyanate component, or can be pre-reacted with the polyisocyanate to form an isocyanate-terminated prepolymer which is subsequently trimerized. The polyols are advantageously employed in the range from about 0.01 equivalent to about 0.5 equivalent per equivalent of isocyanate, and preferably from about 0.1 equivalent to about 0.35 equivalent.

A particularly preferred class of polyols consists of the polyethers, for example, the polyoxyalkylene glycols such as the polyoxyethylene glycols in the molecular weight range of from about 200 to about 600. These compounds are prepared by the addition of ethylene oxide to water, ethylene glycol or diethylene glycol. Also included are the polyoxypropylene glycols prepared by the addition of 1,2-propylene oxide to water, propylene glycol, etc. And the polyols which are mixtures of 20 to 90 percent by weight of (a) the product obtained by reacting from 2 to 5 moles of alkylene oxide (propylene oxide preferred) with 1 amine equivalent of a mixture of polyamines obtained by acid condensation of aniline and formaldehyde and 10 to 80 percent by weight of (b) a supplementary polyol of equivalent weight 30 to 200 and functionality from 2 to 6 inclusive. Said mixed polyols are prepared in accordance with U.S. Pat. No. 3,423,344 and the overall hydroxyl number of the mixtures fall within the range of 280 to 650.

The polyisocyanates employed in the preparation of polyisocyanurate foams in accordance with the present invention can be any of the organic polyisocyanates conventionally employed in the art for this purpose previously; see the art cited supra. Advantageously, in order to obtain foams having exceptionally high heat resistance and structural strength, the polyisocyanates employed in the process of the invention are polymethylene polyphenyl polyisocyanates, particularly those set forth in U.S. Pat. No. 3,745,133. A particularly preferred form of polymethylene polyphenyl polyisocyanate is one having an acidity, expressed as "% hot HCl" of less than about 0.1 percent. Various methods of reducing the acidity to such levels are known in the art. A particularly useful process is that set forth in U.S. Pat. No. 3,793,362. The latter process comprises treating the polyisocyanate with from 0.25 to 1 equivalent of monomeric epoxide for each equivalent of acid present in the polyisocyanate.

A most preferred polyisocyanate is a mixture containing from about 30 percent to about 85 percent by weight of methylenebis(phenylisocyanate) and the remainder of said mixture comprises polymethylene polyphenylisocyanates of functionality higher than 2.0.

In carrying out the preparation of polyisocyanurate foams in accordance with the process of the invention, and in particular polyisocyanurate foams for the preparation of foam laminates, the procedures and equipment conventional in the art are employed. The proportions of cocatalyst are so chosen that, for each equivalent of polyisocyanate present in the reaction mixture, there is employed from about 0.00145 to about 0.0087 equivalent, preferably from about 0.003 to about 0.0058 equivalent, and most preferably from about 0.00365 to about 0.0051 equivalent of said glycine salt (a); from about 0.00062 to about 0.0041 equivalent, preferably from about 0.001 to about 0.0041 equivalent, and most preferably from about 0.001 to about 0.0031 equivalent of said hydroxyalkyltrialkylammonium carboxylate (b); and from about 0.00087 to about 0.007 equivalent, preferably from about 0.00175 to about 0.00525 equivalent and most preferably from about 0.00175 to about 0.0035 equivalent of said alkali metal salt (c). The equivalent weights of compounds (a), (b), and (c) are the same as their respective mole weights.

Foaming agents, and other optional additives such as dispersing agents, cell stabilizers, surfactants, flame retardants, and the like, can be employed according to the teachings of the incorporated reference. A particularly preferred class of flame retardant additives are the phosphorus containing flame retardants, such as: tris(2-chloroethyl)phosphate, tris(2-chloropropyl)phosphate, tris(2,3-dibromopropyl)phosphate, tris(1,3-dichloroisopropyl)phosphate, and the like.

As set forth above, the use of the cocatalyst combination of the invention results in the facile formation of foam laminate board material. It provides the foam rise characteristics necessary in the polyisocyanurate foams of the invention to enable the otherwise difficult, if not impossible, continuous production of foam laminate board possessing uniform thickness, excellent adhesive properties to all the facer materials conventionally used in the art, and wrinkle-free contact between resultant foam and facer material. The catalyst combination of the invention also provides the advantageous properties listed hereinabove over a wide range of laminate board thickness from about ½ inch to 4 inches.

Standard continuous laminating machinery (such as that equipment provided by the Admiral Equipment Corporation, Akron, Ohio) can be employed in preparing the laminate board referred to hereinabove. The polyisocyanurate foams made in accordance with the invention show excellent adhesion to a wide variety of facer materials known to those skilled in the art such as: aluminum foil in various thicknesses, tar paper, Kraft paper, foil/Kraft/foil combination, asphalt felt, various types of felt, paper cupstock, transite, polyethylene, polypropylene, polyvinylchloride, fiber-glass scrim in aluminum, and the like.

Thus, the cellular products of the invention are particularly suitable for the preparation of foam laminate board material where thermal resistance, low flame spread, and low smoke generation on combustion are required. For example, the cellular laminate board stock can be employed as insulating materials for roof decks and wall insulation in all types of construction and especially industrial buildings. The excellent resistance to distortion and volume change under conditions of elevated temperature, make the laminate board material particularly suitable for use in roof deck application where the material is subject to extremes in temperature range, and other applications where similar environmental conditions occur.

The following preparations and examples describe the manner and process of making and using the invention and set forth the best mode contemplated by the inventors of carrying out the invention but are not to be construed as limiting.

PREPARATION 1

2-Hydroxypropyltrimethylammonium formate

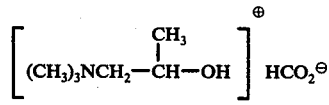

A 50 ml, 3-neck flask fitted with a stirrer, thermometer, gas inlet tube, and reflux condenser (protected from moisture by a calcium chloride tube), was charged with 4.8 g. (0.105 mole) of formic acid dissolved in 14.4 g. of dipropylene glycol and cooled to 0° – 5° C. Trimethylamine, 7.3 g. (0.12 mole) was bubbled into the solution. Thereafter, 6.1 g. (0.105 mole) of propylene oxide was added. The solution was heated to 45° C for one hour. After standing overnight, the residual solution was analyzed by Carbon Magnetic Resonance (using a Varian CFT-20 Spectrometer locked on internal $D_2O$) and infrared spectroscopy, and identified as the dipropylene glycol solution of 2-hydroxypropyltrimethylammonium formate.

The solution, which contained approximately 54 percent by weight of the formate, was used directly as a cocatalyst component in the present invention.

PREPARATION 2

2-Hydroxypropyltrimethylammonium 2-ethylhexanoate

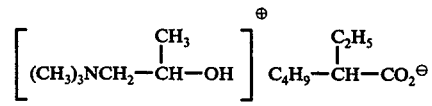

A 50 ml, 3-neck flask fitted as in Preparation 1 was charged with a solution of 1.44 g. (0.01 mole) of 2-ethylhexanoic acid dissolved in 2.5 g. of dipropylene glycol and cooled to 5° C. Trimethylamine, 1.0 g. (0.017 mole) was bubbled into the solution followed by 0.58 g. (0.01 mole) of propylene oxide. The solution was stirred overnight at 25° C and excess trimethylamine was removed in vacuo using a Roto-Vac apparatus under about 10 mm pressure and hot water bath. The solution obtained was analyzed by Carbon Magnetic Resonance, and infrared spectroscopy, and identified as the dipropylene glycol solution of 2-hydroxypropyltrimethylammonium 2-ethylhexanoate.

The solution contained about 51 percent by weight of the hexanoate salt.

PREPARATIONS 3 – 7

Using the procedure and molar amounts set forth in Preparation 1 but substituting the appropriate amine, acid, and alkylene oxide reactants set forth in the following table there are prepared the salts of Prep. 3 to 7 in dipropylene glycol (DPG) having the respective percent by weight content of salt set forth therein. In Prep. 7 the salt is prepared originally in about 75 weight percent in DPG and thereafter is diluted with chloroform to reduce the content to the value set forth in the table.

| Prep. | Amine | Acid | Alkylene Oxide | % by wt. in dipropylene glycol (DPG) |
|---|---|---|---|---|
| 3 | Trimethylamine | Formic | Ethylene | 50 |
| 4 | Triethylamine | Formic | Ethylene | 30 |
| 5 | Trimethylamine | Acetic | Propylene | 70 |
| 6 | Trimethylamine | Butyric | Propylene | 50 |
| 7 | Trimethylamine | 2-Ethylhexanoic | Propylene | 54 in 2:1 of CHCl$_3$:DPG |

EXAMPLE 1

The following rigid polyisocyanurate foams set forth a comparison of the rise characteristics and foam exotherm profile for foams prepared in accordance with the present invention (Foams B through F) with Foam A prepared in accordance with the prior art.

Foams were prepared as hand-mix samples by blending together the various components (as parts by weight) set forth in Table I in 1 qt. cups. A high speed drill press motor equipped with a stirrer blade was used to thoroughly mix the ingredients. The mixture was rapidly poured into a cardboard box and allowed to rise freely. These hand-mix formulations for Foams A through F provide rise characteristics which are particularly suited to laminate or pour-in-place application, namely, extended cream times accompanied by effectively rapid cure out times.

Foam A prepared in accordance with the prior art required the catalyst combination of potassium N-phenyl-2-ethylhexamide (Catalyst A), sodium N-(2-hydroxy-5-nonylphenyl)methyl-N-methyl glycinate (Catalyst B), an epoxide (DER 330), and a tertiary amine (N,N-dimethylcyclohexylamine), and was characterized by the rise and foam exotherm profiles set forth in Table I.

Foams C through F retained the combination of Catalyst A and B, however both the epoxide and amine were replaced by the single component of either the quaternary ammonium formate salt (Catalyst C) in the case of Foam C, or the quaternary ammonium hexanoate salt (Catalyst D) in Foams D to F. Rise times for Foams C to F were superior to those of Foam A, displaying even longer cream times accompanied by more rapid cure outs than the latter foam. Comparison of the exotherm profile for Foam C with that of Foam A further sets forth the more efficient cure out of the foams prepared in accordance with the present invention over those prepared according to the prior art. After each time measurement interval and the maximum temperature reached, Foam C clearly recorded higher temperatures. A 10 minute period to reach maximum temperature in Foam C was observed.

The inclusion of the epoxide ingredient of the prior art in the catalyst combination of the present invention (Foam B) was without effect on rise times and had only a slight negative effect on the exotherm profile when compared to Foam C. This clearly demonstrated that when using the catalyst combination in accordance with the present invention, the epoxide component becomes superfluous.

Hand layup laminates were prepared using the same formulations set forth for both Foams D and E wherein the ingredients were mixed and then poured onto either tar paper or Olinkraft 663 (foil-Kraft-foil). A layer of tar paper or Olinkraft 663 was immediately placed over the liquid mixture which was allowed to rise. Thereafter, the sample laminate was cured in an oven for 1.5 minutes at 200° F. The resulting cured laminate samples had very good appearance. Both top and bottom interfaces were smooth with very little porosity.

TABLE I

| Foams | A | B | C | D | E | F |
|---|---|---|---|---|---|---|
| Ingredients: | | | | | | |
| Component A: | | | | | | |
| Polyisocyanate I[1] | 134 | 134 | 134 | 134 | 134 | 134 |
| L-5340[2] | 1 | 1 | 1 | 1 | 1 | 1 |
| R-11B | 17.1 | 12.5 | 10.8 | 10.8 | 10.8 | 10.8 |
| Component B: | | | | | | |
| Polyol I[3] | 45 | 45 | 45 | 45 | 45 | 45 |
| DC-193[4] | 1 | 1 | 1 | 1 | 1 | 1 |
| R-11B | 15 | 22 | 22 | 22 | 22 | 22 |
| Component C: | | | | | | |
| DER 330[5] | 6 | 6 | | | | |
| R-11B | 1.5 | 3 | | | | |
| Component D: | | | | | | |
| Catalyst A[6] | 2.54 | 1 | 1 | 1 | 0.6 | 0.8 |
| Catalyst B[7] | 1.27 | 3 | 3 | 3 | 1.8 | 2.4 |
| N,N-dimethylcyclohexylamine | 0.19 | | | | | |
| Catalyst C[8] | | 1 | 1 | | | |
| Catalyst D[9] | | | | 1 | 0.6 | 0.8 |
| Rise Characteristics: (minutes:seconds) | | | | | | |
| Mix | :08 | :07 | :07 | :07 | :07 | :07 |
| Cream | :14 | :15 | :17 | :15 | :24 | :18 |
| Initiation | :15 | :17 | :19 | :16 | :25 | :20 |
| Gel | :58 | :42 | :38 | :35 | 1:06 | :44 |
| Rise | 1:30 | :60 | :55 | :45 | 1:25 | :60 |
| Firm | 1:45 | :50 | :45 | :45 | 1:25 | :55 |
| Tack Free | 3:00 | 1:15 | 1:10 | 1:15 | 3:00 | 1:30 |
| Foam Exotherm(° F): | | | | | | |
| 1 min. | 140 | 187 | 206 | | | |
| 2 min. | 243 | 258 | 268 | | | |
| 3 min. | 264 | 277 | 284 | | | |
| Maximum | 289 | 288 | 298 | | | |
| Time (minutes:secs.) to Max. | | 7:30 | 10:00 | | | |

Footnotes to Table I:
[1] Polyisocyanate I is a polymethylene polyphenylisocyanate mixture treated with a minor amount of monomeric epoxide to reduce acidity as taught in U.S. Pat. No. 3,793,362. The mixture contained about 30 percent by weight of methylenebis(phenylisocyanate) and the remainder of said mixture is comprised of polymethylene polyphenylisocyanates having a functionality greater than 2; Isocyanate equivalent = 140; acidity = 0.07%.
[2] L-5340 is a rigid foam silicone surfactant supplied by Union Carbide Corporation; see Union Carbide Bulletin F-42172A, October, 1970.
[3] This polyol has an equivalent weight = 139 and an average functionality of 4.5 and is a blend in accordance with U.S. Pat. No. 3,423,344 of (i) approximately 75 percent by weight of an adduct of propylene oxide and a methylene bridged polyphenylpolyamine mixture obtained by acid condensation of aniline and formaldehyde and (ii) approximately 25 percent by weight of a polyethylene glycol of M.W. range of 190 to 210.
[4] DC-193: A silicone surfactant supplied by Dow Corning Corp.; see "Dow Corning 193 Surfactant", Bulletin 05-146, February, 1966.
[5] DER 330 is a bis-phenol A based epoxy resin supplied by Dow Chemical Co., Midland, Mich.; Epoxy equiv. wt. = 180-189, visc. = 7,000-10,000 cps at 25° C.
[6] Catalyst A: A solution comprised of 45 percent by weight of potassium N-phenyl-2-ethylhexamide, 27 percent ethylene glycol, and 28 percent dimethylformamide.
[7] Catalyst B: A solution comprised of 50 percent by weight of sodium N-(2-hydroxy-5-nonylphenyl)methyl-N-methyl glycinate in diethylene glycol.
[8] Catalyst C: A solution comprised of 50 percent by weight of 2-hydroxypropyltrimethylammonium formate and 50 percent dipropylene glycol.
[9] Catalyst D: A solution comprised of 54 percent by weight 2-hydroxypropyltrimethylammonium 2-ethylhexanoate, 27 percent by weight chloroform, 13.5 percent dipropyleneglycol, and 5.4 percent hexanoic acid.

EXAMPLE 2

For purposes of comparison and using the procedure of Example 1 and the ingredients (parts by wt.) set forth in Table II, there were prepared the following rigid polyisocyanurate Foams G through K, none of which are in accordance with the present invention.

Foam G was a rigid polyisocyanurate foam in accordance with the prior art and was characterized by an extended cream time and rapid rise time, particularly suited to laminate type formation.

Foam H was identical to Foam G except that Catalyst A, B, and the N,N-dimethylcyclohexylamine were replaced by 1 part of the 2-hydroxypropyltrimethylammonium formate solution (Catalyst C). The resulting rise characteristics for Foam H compared to those of Foam G were too slow. An increase of the formate catalyst to 2 parts in Foam I resulted in too rapid rise characteristics.

Similarly, Foams J and K wherein 1 and 2 parts of a 2-hydroxypropyltrimethylammonium 2-ethylhexanoate solution (Catalyst D) replaced the Catalyst A, B, and N,N-dimethylcyclohexylamine of Foam G, were observed to have too slow and too fast rise characteristics respectively.

TABLE II

| Foams | G | H | I | J | K |
|---|---|---|---|---|---|
| Ingredients: | | | | | |
| Component A: | | | | | |
| Polyisocyanate I | 134 | 134 | 134 | 134 | 134 |
| R-11B | 26 | 26 | 26 | 26 | 26 |
| Component B: | | | | | |
| Carbowax 400[1] | 25 | 25 | 25 | 25 | 25 |
| DEN-431[2] | 8 | 8 | 8 | 8 | 8 |
| DC-193 | 1.5 | 1.5 | 1.5 | 1.5 | 1.5 |
| R-11B | 4 | 4 | 4 | 4 | 4 |
| Component C: | | | | | |
| Catalyst A(see Ex.1) | 1 | | | | |
| Catalyst B(see Ex.1) | 4 | | | | |
| N,N-dimethylcyclo-hexylamine | 0.15 | | | | |
| Carbowax 400 | 5 | 5 | 5 | 5 | 5 |
| Catalyst C(see Ex.1) | | 1 | 2 | | |
| Catalyst D(see Ex.1) | | | | 1 | 2 |
| Rise Characteristics: (minutes:seconds) | | | | | |
| Mix | :05 | :05 | :05 | :05 | :05 |
| Initiation | :15 | :35 | :07 | :20 | :10 |
| 1st Rise | | | | :40 | |
| 2nd Initiation | | | | 1:00 | |
| Gel | :40 | 1:20 | :10 | 1:00 | :15 |
| Rise | :45 | 1:30 | :12 | 1:20 | :20 |
| | Good overall times | Cream too slow | Too fast | Shows 2 rises with delay between 1st Rise and 2nd Initiation too long | Too fast |

Footnotes to Table II:
[1]Carbowax 400: A polyethylene glycol product of Union Carbide having a molecular weight range of 380 to 420.
[2]DEN-431: Dow epoxy novolac resin, viscosity of 76,500 cps. at 25° C, see "DEN Epoxy Novolac Resins", The Dow Chemical Co., 1967 pgs. 1-2.

EXAMPLE 3

The following rigid polyisocyanurate Foams L through N were prepared in accordance with the present invention using the procedure of Example 1 and the ingredients (parts by weight) set forth in Table III.

Replacement of the Catalyst A of Foam L by 1 part of a potassium acetate or potassium 2-ethylhexanoate solution as set forth in Table III provided Foams M and N respectively which were characterized by rise profiles that were virtually identical to the rise profile of Foam L. Foams L, M, and N had similar appearance, cell structure, and resilience.

TABLE III

| Foams | L | M | N |
|---|---|---|---|
| Ingredients: | | | |
| Component A: | | | |
| Polyisocyanate I | 134 | 134 | 134 |
| L-5340 | 1 | 1 | 1 |
| R-11B | 13 | 13 | 13 |
| Component B: | | | |
| Polyol I | 45 | 45 | 45 |
| DC-193 | 0.7 | 0.7 | 0.7 |
| R-11B | 25.5 | 25.5 | 25.5 |
| Component C: | | | |
| Catalyst A(see Ex.1) | 1 | | |
| Catalyst B(see Ex.1) | 3 | 3 | 3 |
| Potassium acetate sol'n. (30% by wt. in ethylene glycol) | | 1 | |
| Potassium 2-ethylhexanoate sol'n. (50% by wt. in dipropylene glycol) | | | 1 |
| Catalyst D(see Ex.1) | 1 | 1 | 1 |
| Rise Characteristics: (minutes:seconds) | | | |
| Mix | :10 | :10 | :10 |
| Initiation | :15 | :17 | :15 |
| Gel | :60 | :55 | :45 |
| Rise | :75 | :75 | :70 |
| Firm | :75 | :75 | :70 |

EXAMPLE 4

The following rigid polyisocyanurate foam laminates were prepared in accordance with the present invention employing the ingredients and proportions by weight set forth in Table IV. An Admiral laminating machine (Admiral Equipment Corp., Akron, Ohio, subsidiary of The Upjohn Company, Kalamazoo, Mich.) was used with "A", "B", and "C" component temperatures of 60° F for each one. Throughput was 40 lbs./minute with a modified 3-stage conical mixer operating at 4500 r.p.m. and having an outlet nozzle diameter of ¾ inch. The conveyor speed was 25 ft./minute and the curing oven air temperature was at 185° F. Laminate thickness was 2 inches and the laminate facers were either tar paper or Olinkraft 666-foil/Kraft/foil paper.

The foam rise characteristics set forth in Table IV were observed for the respective foam samples O through T by collecting samples of each foam shot in a large cardboard box. Each sample was characterized by an extended initiation period followed by a rapid rise and firm time.

Although three components as set forth in Table IV were employed, the laminates can also be prepared from two components by combining B and C for those laminating machines that are equipped only for two-component operation.

Table V sets forth the physical properties of core foam samples taken from an asphalt paper laminate and a foil/Kraft/foil laminate both prepared with Foam O. Both foam samples are characterized by good fire resistance and good physical properties.

TABLE IV

| Foams | O | P | Q | R | S | T |
|---|---|---|---|---|---|---|
| Ingredients: | | | | | | |
| Component A: | | | | | | |
| Polyisocyanate II[1] | 139 | 139 | 139 | 139 | 139 | 139 |
| L-5340 | 1 | 1 | 1 | 1 | 1 | 1 |
| R-11B | 13 | 13 | 13 | 13 | 13 | 13 |
| Component B: | | | | | | |
| Polyol I | 45 | 45 | 45 | 45 | 45 | 45 |
| DC-193 | 0.7 | 0.7 | 0.7 | 0.7 | 0.7 | 0.7 |
| R-11B | 25.5 | 25.5 | 25.5 | 25.5 | 25.5 | 25.5 |
| Component C: | | | | | | |
| Catalyst A(see Ex.1) | 0.8 | 1.3 | 1.6 | 1.0 | 2.0 | 0.56 |
| Catalyst B(see Ex.1) | 2.5 | 1.3 | 0.8 | 1.0 | 0.67 | 1.7 |
| Catalyst D(see Ex.1) | 0.8 | 0.67 | 0.8 | 1.0 | 0.67 | 1.1 |
| Carbowax-200[2] | 0.8 | 0.67 | 0.8 | 1.0 | 0.67 | 0.56 |
| Rise Characteristics: | | | | | | |

TABLE IV-continued

| Foams | O | P | Q | R | S | T |
|---|---|---|---|---|---|---|
| (seconds) | | | | | | |
| Initiation | 18 | 28 | 28 | 25 | 23 | 22 |
| Gel | 40 | 53 | 48 | 43 | 40 | 39 |
| Rise | 50 | 65 | 63 | 54 | 50 | 53 |
| Firm | 50 | 65 | 63 | 54 | 50 | 53 |
| Tack Free | 80 | | | | | 80 |

Footnotes to Table IV:

[1]Polyisocyanate II is the polyisocyanate derived from the reaction of 5 parts of Carbowax 400 (defined in Example 2) with 134 parts of Polyisocyanate I after heating the mixture at about 140° F for about 4 to 6 hours.
[2]Carbowax-200: a polyethylene glycol product of Union Carbide having a molecular weight range of 190 to 210.

TABLE V

| Laminate Foam (Foam O) Properties | | |
|---|---|---|
| | Asphalt Paper | Foil/Kraft/Foil |
| Density, pcf | 2.01 | 1.87 |
| Oxygen Index (%)[1] | 23.7 | 23.4 |
| Friability[2] | 1.1% | 1.4% |
| Compressive str. (psi) | | |
| ⊥ perpendicular to rise | 13.2 | 9.9 |
| Closed cells | 91.7% | 91.2% |
| ASTM E-84 Test: | | |
| Flame Spread Rating (FSR) | 35.9 | 23.1 |
| Smoke Generated | 250 | 190 |

Footnotes to Table V:
[1]Flammability test conducted according to the ASTM D-2863 procedure and reported as the present oxygen content required to sustain sample combustion.
[2]Friability as measured by the ASTM C-421-61 test for a 10 minute period.

EXAMPLE 5

The two following rigid polyisocyanurate foams (Foam U and Foam V) were prepared in accordance with the present invention using the hand-mix technique set forth in Example 1 and the ingredients and proportions in parts by weight set forth in Table VI.

Two components, A and B, were employed. A component comprising the Polyisocyanate I, the surfactant, and Freon, were mixed at the time of foam preparation. B component was prepared as a large master batch comprising the ingredients and proportions by weight set forth in Table VI. Foam U was prepared using the freshly prepared B component while Foam V was prepared using the B component after it stood for 28 days.

The foams were characterized by virtually identical rise characteristics thereby demonstrating the long term stability of the B component ingredients when mixed with each other.

TABLE VI

| Foams | U | V |
|---|---|---|
| Ingredients: | | |
| Component A: | | |
| Polyisocyanate I | 134 | 134 |
| L-5340 | 1 | 1 |
| R-11B | 13 | 13 |
| Component B: | | |
| Polyol I | 45 | 45 |
| DC-193 | 0.7 | 0.7 |
| R-11B | 25.5 | 25.5 |
| Catalyst A (see Ex.1) | 1 | 1 |
| Catalyst B (see Ex.1) | 3 | 3 |
| Catalyst D (see Ex.1) | 1 | 1 |
| Rise Characteristics: | | |
| (minutes:seconds) | | |
| Initiation | :15 | :17 |
| Gel | :50 | :50 |
| Rise | :75 | :70 |
| Firm | 1:15 | 1:10 |

We claim:

1. In a process for the preparation of a cellular polymer in which the major recurring polymer unit is isocyanurate which process comprises bringing together in the presence of a blowing agent, an organic polyisocyanate, a trimerization catalyst, and a minor amount of a polyol, the improvement which comprises employing as the catalyst, a combination consisting essentially of:

(a) a glycine salt having the formula

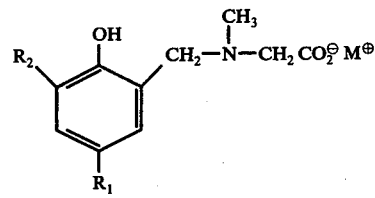

wherein M is an alkali metal, $R_1$ is selected from the class consisting of hydrogen and alkyl having from 1 to 12 carbon atoms, and $R_2$ is selected from the class consisting of hydrogen and the group

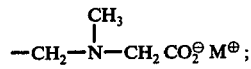

(b) a hydroxyalkyltrialkylammonium carboxylate salt having the formula

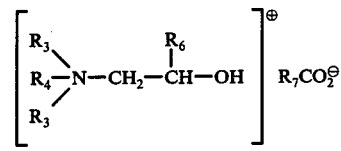

wherein $R_3$, $R_4$, $R_5$ can be the same or different and represent alkyl having from 1 to 4 carbon atoms, inclusive, $R_6$ is selected from the group consisting of hydrogen and alkyl having from 1 to 4 carbon atoms, inclusive, and $R_7$ is selected from the class consisting of hydrogen and alkyl having from 1 to 8 carbon atoms, inclusive; and (c) an alkali metal salt selected from the group consisting of
(i) an amide salt having the formula

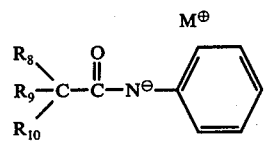

wherein M is as defined hereinbefore, $R_8$, $R_9$, and $R_{10}$ can be the same or different and are selected from the group consisting of hydrogen and alkyl from 1 to 4 carbon atoms, inclusive; and (ii) a carboxylic acid salt having the formula

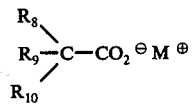

wherein $R_8$, $R_9$, $R_{10}$ and M are as defined hereinbefore.

2. A process according to claim 1 wherein the organic polyisocyanate is a polymethylene polyphenyl polyisocyanate.

3. A process for the preparation of a cellular polymer in which the major recurring polymer unit is isocyanurate which process comprises bringing together in the presence of a blowing agent:
(A) a polymethylene polyphenylisocyanate;
(B) a minor amount of a polyol; and
(C) a catalyst combination consisting essentially of
   (a) a glycine salt having the formula

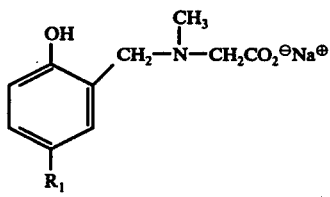

wherein $R_1$ is selected from the class consisting of hydrogen and alkyl having from 1 to 12 carbon atoms;
   (b) a 2-hydroxypropyltrimethylammonium carboxylate salt having the formula

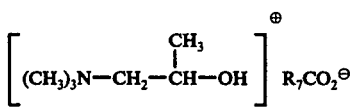

wherein $R_7$ is selected from the class consisting of hydrogen and alkyl having from 1 to 8 carbon atoms inclusive; and
   (c) a potassium salt selected from the group consisting of
      (i) an amide salt having the formula

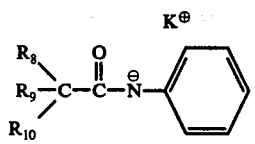

wherein $R_8$, $R_9$, and $R_{10}$ can be the same or different and are selected from the group consisting of hydrogen and alkyl from 1 to 4 carbon atoms, inclusive; and
      (ii) a carboxylic acid salt having the formula

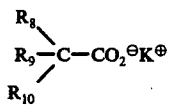

wherein $R_8$, $R_9$, and $R_{10}$ are as defined above.

4. A process according to claim 3 wherein the polymethylene polyphenylisocyanate is a mixture containing from about 30 percent to about 85 percent by weight of methylenebis (phenylisocyanate) and the remainder of said mixture comprises polymethylene polyphenylisocyanates of functionality higher than 2.0.

5. A process according to claim 4 wherein said polyisocyanate has been previously treated with about 0.25 equivalent to about 1.0 equivalent of a monomeric epoxide per equivalent of acid present in said polyisocyanate to reduce acidity to less than about 0.10 percent.

6. A process according to claim 3 wherein said glycine salt (a) is sodium N-(2-hydroxy-5-nonylphenyl)-methyl-N-methyl glycinate and is present in the form of a solution from about 25 percent to about 75 percent by weight in diethylene glycol.

7. A process according to claim 3 wherein said ammonium salt (b) is 2-hydroxypropyltrimethylammonium formate and is present in the form of a solution of from about 25 percent to about 75 percent by weight in dipropylene glycol.

8. A process according to claim 3 wherein said ammonium salt (b) is 2-hydroxypropyltrimethylammonium 2-ethylhexanoate and is present in the form of a solution of from about 25 percent to about 75 percent by weight in dipropylene glycol.

9. A process according to claim 3 wherein said potassium salt (c) is

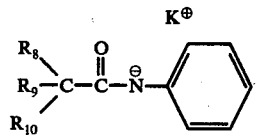

wherein $R_8$, $R_9$, and $R_{10}$ can be the same or different and are selected from the group consisting of hydrogen and alkyl from 1 to 4 carbon atoms, inclusive.

10. A process according to claim 9 wherein said potassium salt is potassium N-phenyl-2-ethylhexamide and is present in the form of a solution of from about 25 percent to about 75 percent by eight in about a 1:1 mixture by weight of ethylene glycol and dimethylformamide.

11. A process according to claim 3 wherein said potassium salt (c) is

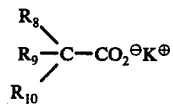

wherein $R_8$, $R_9$, and $R_{10}$ can be the same or different and are selected from the group consisting of hydrogen and alkyl from 1 to 4 carbon atoms, inclusive.

12. A process according to claim 11 wherein said potassium salt is potassium acetate and is present in a solution of from about 25 percent to about 75 percent by weight in ethylene glycol.

13. A process according to claim 11 wherein said potassium salt is potassium 2-ethylhexanoate and is present in a solution of from about 25 percent to about 75 percent by weight in dipropylene glycol.

14. A process for the preparation of a cellular polymer in which the major recurring polymer unit is isocyanurate which process comprises bringing together in the presence of a blowing agent:
(A) a polymethylene polyphenylisocyanate mixture containing about 30 percent to about 40 percent by weight of methylenebis(phenylisocyanate) and the remainder of said mixture comprises polymethylene polyphenylisocyanates of functionality higher than 2.0 and wherein said polyphenylisocyanate mixture has been previously mixed at room temperature with about 0.25 equivalent to about 1.0 equivalent of a monomeric epoxide per equivalent of acid present in said polyisocyanate to reduce acidity to less than about 0.10 percent;

(B) a minor amount of a polyol; and (C) a catalyst combination consisting essentially of
  (a) sodium N-(2-hydroxy-5-nonylphenyl)methyl-N-methyl glycinate wherein said glycinate is present in the form of a solution of about 50 percent by weight in diethylene glycol;
  (b) 2-hydroxypropyltrimethylammonium 2-ethylhexanoate wherein said hexanoate is present in the form of a solution of about 54 percent by weight in about a 2:1 mixture by weight of chloroform and dipropylene glycol; and
  (c) potassium N-phenyl-2-ethylhexamide wherein said hexamide is present in the form of a solution of about 45 percent by weight in about a 1:1 mixture by weight of ethylene glycol and dimethylformamide.

15. A cocatalyst combination for the trimerization of an organic polyisocyanate consisting essentially of
  (a) from about 11 to about 85 mole percent of a glycine salt having the formula

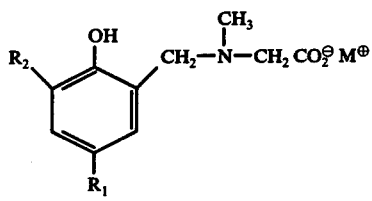

wherein M is an alkali metal, $R_1$ is selected from the class consisting of hydrogen and alkyl having from 1 to 12 carbon atoms, and $R_2$ is selected from the class consisting of hydrogen and the group

(b) from about 4 to about 63 mole percent of a hydroxyalkyltrialkylammonium carboxylate salt having the formula

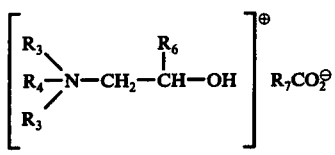

wherein $R_3$, $R_4$ and $R_5$ can be the same or different and represent alkyl having from 1 to 4 carbon atoms, inclusive, $R_6$ is selected from the group consisting of hydrogen and alkyl having from 1 to 4 carbon atoms, inclusive, and $R_7$ is selected from the class consisting of hydrogen and alkyl having from 1 to 8 carbon atoms inclusive; and (c) from about 6 to 77 mole percent of an alkali metal salt selected from the group consisting of
  (i) an amide salt having the formula

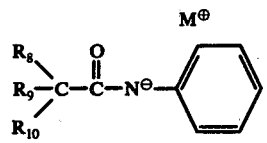

wherein M is as defined hereinbefore, $R_8$, $R_9$, and $R_{10}$ can be the same or different and are selected from the group consisting of hydrogen and alkyl from 1 to 4 carbon atoms, inclusive, and (ii) a carboxylic acid salt having the formula

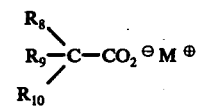

wherein $R_8$, $R_9$, $R_{10}$, and M are as defined hereinbefore.

16. A cocatalyst combination for the trimerization of an organic polyisocyanate consisting essentially of:
  (a) from about 11 to about 85 mole percent of a glycine salt having the formula

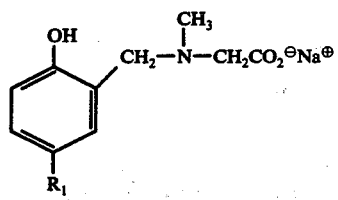

wherein $R_1$ is selected from the class consisting of hydrogen and alkyl having from 1 to 12 carbon atoms;

(b) from about 4 to about 63 mole percent of a 2-hydroxypropyltrimethylammonium carboxylate salt having the formula

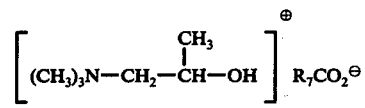

wherein $R_7$ is selected from the class consisting of hydrogen and alkyl having from 1 to 8 carbon atoms inclusive; and (c) from about 6 to about 77 mole percent of a potassium salt selected from the group consisting of
  (i) an amide salt having the formula

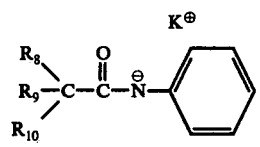

wherein $R_8$, $R_9$, and $R_{10}$ can be the same or different and are selected from the group consisting of hydrogen and alkyl from 1 to 4 carbon atoms, inclusive;

(ii) a carboxylic acid salt having the formula

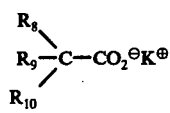

wherein $R_8$, $R_9$ and $R_{10}$ are as defined above.

17. A cocatalyst according to claim 16 wherein said glycine salt (a) is sodium N-(2-hydroxy-5-nonylphenyl)-methyl-N-methyl glycinate and is present in the form of a solution of from about 25 percent to about 75 percent by weight in diethylene glycol.

18. A cocatalyst according to claim 16 wherein said ammmonium salt (b) is 2-hydroxypropyltrimethylammonium formate and is present in the form of a solution of from about 25 percent to about 75 percent by weight in dipropylene glycol.

19. A cocatalyst according to claim 16 wherein said ammonium salt (b) is 2-hydroxypropyltrimethylammonium-2-ethylhexanoate and is present in the form of a solution of from about 25 percent to about 75 percent by weight in dipropylene glycol.

20. A cocatalyst according to claim 16 wherein said potassium salt (c) is

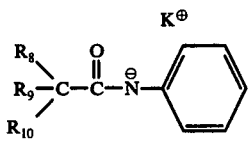

wherein $R_8$, $R_9$, and $R_{10}$ can be the same or different and are selected from the group consisting of hydrogen and alkyl from 1 to 4 carbon atom, inclusive.

21. A cocatalyst according to claim 20 wherein said potassium salt is N-phenyl-2-ethylhexamide and is present in the form of a solution of from about 25 percent to about 75 percent by weight in about a 1:1 mixture by weight of ethylene glycol and dimethylformamide.

22. A cocatalyst according to claim 16 wherein said potassium salt (c) is

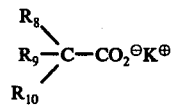

wherein $R_8$, $R_9$, and $R_{10}$ can be the same or different and are selected from the group consisting of hydrogen and alkyl from 1 to 4 carbon atoms, inclusive.

23. A cocatalyst according to claim 22 wherein said potassium salt is potassium acetate and is present in a solution of from about 25 percent to about 75 percent by weight in ethylene glycol.

24. A cocatalyst according to claim 22 wherein said potassium salt is potassium 2-ethylhexanoate and is present in a solution of from about 25 percent to about 75 percent by weight in dipropylene glycol.

25. A cocatalyst combination for the trimerization of an organic polyisocyanate consisting essentially of:
  (a) from about 35 to about 65 mole percent of sodium N-(2-hydroxy-5-nonylphenyl)methyl-N-methyl glycinate wherein said glycinate is present in the form of a solution of about 50 percent by weight in diethylene glycol;
  (b) from about 10 to about 36 mole percent of 2-hydroxypropyltrimethylammonium-2-ethylhexanoate wherein said hexanoate is present in the form of a solution of about 54 percent by weight in about a 2:1 mixture by weight of chloroform and dipropylene glycol; and
  (c) from about 18 to about 43 mole percent of potassium N-phenyl-2-ethylhexamide wherein said hexamide is present in the form of a solution of about 45 percent by weight in about a 1:1 mixture by weight of ethylene glycol and dimethylformamide.

26. A laminate panel comprising a foam core made in accordance with the process set forth in claim 1 and having the opposing faces of said core bonded to a facing material.

* * * * *

UNITED STATES PATENT OFFICE
CERTIFICATE OF CORRECTION

Patent No. 4,101,465      Dated July 18, 1978

Inventor(s) Robert J. Lockwood, Alexander McLaughlin and Harold E. Reymore, Jr.

It is certified that error appears in the above-identified patent and that said Letters Patent are hereby corrected as shown below:

Column 2, lines 34-38:      Should read:

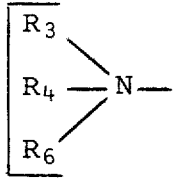      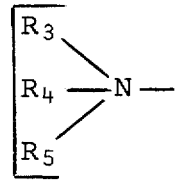

Column 16, claim 1,
lines 31-36:      Should read:

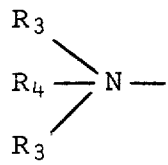      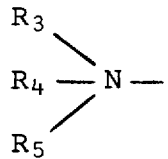

Column 18, claim 10, line 34:      Should read:

eight                      weight

UNITED STATES PATENT OFFICE
CERTIFICATE OF CORRECTION

Patent No. 4,101,465    Dated July 18, 1978

Inventor(s) Robert J. Lockwood, Alexander McLaughlin and Harold E. Reymore, Jr.

It is certified that error appears in the above-identified patent and that said Letters Patent are hereby corrected as shown below:

Column 19, claim 15, lines 50-55:          Should read:

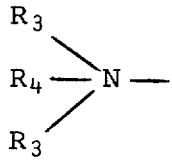          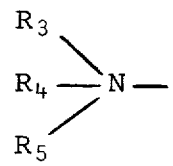

Column 20, claim 15, lines 1-7:          Should read:

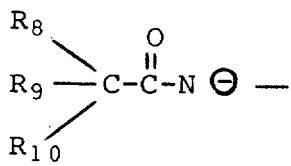          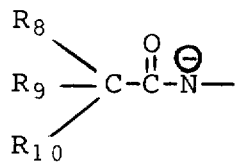

Column 21, claim 20, line 37:    Should read:

atom          atoms

Signed and Sealed this

Sixteenth Day of January 1979

[SEAL]

Attest:

RUTH C. MASON
Attesting Officer

DONALD W. BANNER
Commissioner of Patents and Trademarks